US009875397B2

(12) United States Patent
Hwang et al.

(10) Patent No.: US 9,875,397 B2
(45) Date of Patent: Jan. 23, 2018

(54) METHOD OF EXTRACTING FEATURE OF INPUT IMAGE BASED ON EXAMPLE PYRAMID, AND FACIAL RECOGNITION APPARATUS

(71) Applicant: Samsung Electronics Co., Ltd., Suwon-si, Gyeonggi-do (KR)

(72) Inventors: Wonjun Hwang, Seoul (KR); Wonjun Kim, Hwaseong-si (KR); Sungjoo Suh, Seoul (KR); Jungbae Kim, Seoul (KR); Jaejoon Han, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 22 days.

(21) Appl. No.: 14/817,389

(22) Filed: Aug. 4, 2015

(65) Prior Publication Data
US 2016/0078283 A1    Mar. 17, 2016

(30) Foreign Application Priority Data

Sep. 16, 2014 (KR) .................. 10-2014-0122796

(51) Int. Cl.
*G06K 9/00* (2006.01)
*G06K 9/62* (2006.01)

(52) U.S. Cl.
CPC ....... *G06K 9/00288* (2013.01); *G06K 9/6244* (2013.01); *G06K 9/6271* (2013.01)

(58) Field of Classification Search
CPC . G06K 9/6244; G06K 9/00288; G06K 9/6271
See application file for complete search history.

(56) References Cited

U.S. PATENT DOCUMENTS

| 8,358,811 | B2  | 1/2013  | Adams et al. |
| 8,503,767 | B2* | 8/2013  | Sun ........................ G06K 9/468 382/159 |
| 8,515,139 | B1  | 8/2013  | Nechyba et al. |
| 8,600,174 | B2  | 12/2013 | Shah et al. |
| 8,615,113 | B2  | 12/2013 | Lee et al. |
| 8,705,810 | B2  | 4/2014  | Wang et al. |
| 2010/0074528 | A1* | 3/2010 | Hu ........................ G06K 9/4671 382/190 |

(Continued)

FOREIGN PATENT DOCUMENTS

| KR | 100442834 B1 | 8/2004 |
| KR | 100480783 B1 | 4/2005 |

(Continued)

OTHER PUBLICATIONS

Svetlana Lazebnik. "Beyond Bags of Features: Spatial Pyramid Matching for Recognizing Natural Scene Categories". IEEE Computer Society Conference. 2006. pp. 2169-2178.

*Primary Examiner* — Aaron W Carter
(74) *Attorney, Agent, or Firm* — Harness, Dickey & Pierce, P.L.C.

(57) ABSTRACT

At least one example embodiment discloses a method of extracting a feature of an input image. The method includes constructing an example pyramid including at least one hierarchical level based on stored example images, generating a codebook in each of the at least one hierarchical level, calculating a similarity between the codebook and the input image, and extracting a feature of the input image based on the similarity.

23 Claims, 10 Drawing Sheets

(56) References Cited

U.S. PATENT DOCUMENTS

| | | | |
|---|---|---|---|
| 2011/0249904 A1* | 10/2011 | Mochizuki | G06K 9/6255 382/225 |
| 2011/0299764 A1 | 12/2011 | Snoek | |
| 2012/0114248 A1* | 5/2012 | Yang | G06F 17/30256 382/190 |
| 2012/0117069 A1* | 5/2012 | Kawanishi | G06K 9/00664 707/740 |
| 2012/0170852 A1* | 7/2012 | Zhang | G06K 9/00281 382/197 |
| 2012/0294520 A1* | 11/2012 | Mei | G06K 9/00335 382/164 |
| 2012/0303610 A1* | 11/2012 | Zhang | G06F 17/30864 707/722 |
| 2012/0321193 A1 | 12/2012 | Ukil et al. | |
| 2013/0044944 A1* | 2/2013 | Wang | G06F 17/3025 382/165 |
| 2013/0064460 A1 | 3/2013 | Zhang et al. | |
| 2013/0108123 A1 | 5/2013 | Hwang et al. | |
| 2014/0205143 A1* | 7/2014 | Zhang | G06K 9/00845 382/103 |
| 2014/0289323 A1* | 9/2014 | Kutaragi | G06Q 50/01 709/203 |
| 2015/0063713 A1* | 3/2015 | Yang | G06K 9/6267 382/225 |
| 2015/0170000 A1* | 6/2015 | Yang | G06K 9/6267 382/224 |
| 2015/0205998 A1* | 7/2015 | Suh | G06K 9/00281 382/118 |
| 2015/0242689 A1* | 8/2015 | Mau | G06F 17/30247 382/190 |
| 2015/0363660 A1* | 12/2015 | Vidal | G06F 17/30277 382/173 |
| 2016/0012280 A1* | 1/2016 | Ito | G06K 9/00288 382/305 |
| 2016/0078283 A1* | 3/2016 | Hwang | G06K 9/00288 382/118 |
| 2016/0148074 A1* | 5/2016 | Jean | G06K 9/4671 382/190 |
| 2017/0140205 A1* | 5/2017 | Gueguen | G06K 9/0063 |
| 2017/0177976 A1* | 6/2017 | Dube | G06K 9/6215 |
| 2017/0185857 A1* | 6/2017 | Adamek | G06K 9/00973 |

FOREIGN PATENT DOCUMENTS

| | | |
|---|---|---|
| KR | 20050039426 A | 4/2005 |
| KR | 100486714 B1 | 5/2005 |
| KR | 100543707 B1 | 1/2006 |
| KR | 20130018763 A | 2/2013 |
| KR | 20130048076 A | 5/2013 |
| KR | 101297736 B1 | 8/2013 |
| KR | 101389980 B1 | 5/2014 |
| KR | 101402078 B1 | 6/2014 |

* cited by examiner

FIG. 3
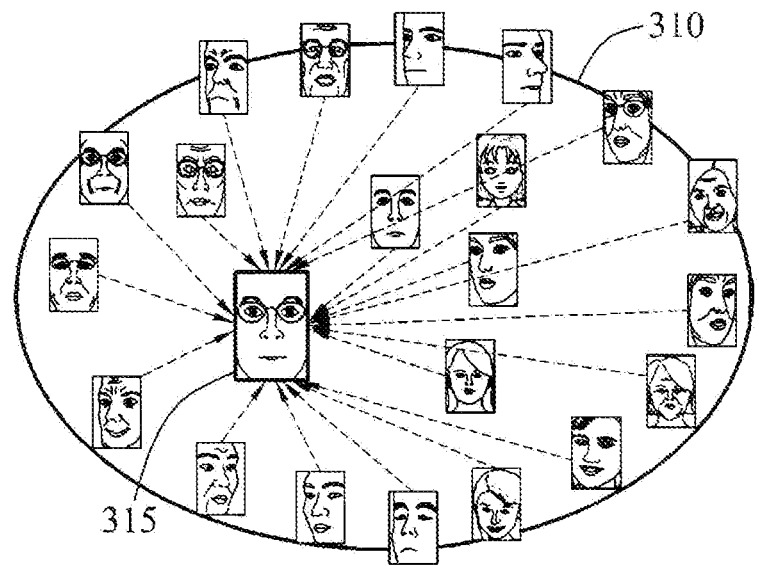
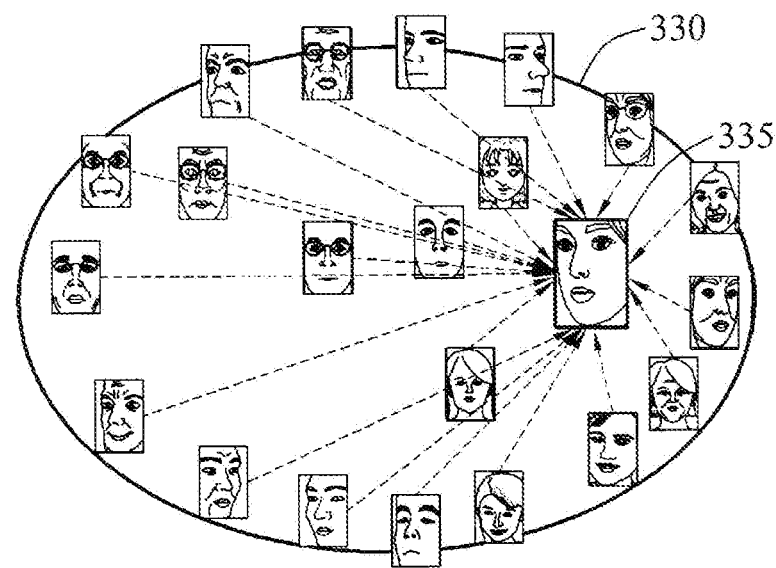

METHOD OF EXTRACTING FEATURE OF INPUT IMAGE BASED ON EXAMPLE PYRAMID, AND FACIAL RECOGNITION APPARATUS

CROSS-REFERENCE TO RELATED APPLICATION

This application claims the priority benefit of Korean Patent Application No. 10-2014-0122796, filed on Sep. 16, 2014, in the Korean Intellectual Property Office, the disclosure of which is incorporated herein by reference in its entirety.

BACKGROUND

1. Field

At least some example embodiments relate to a method of extracting a feature of an input image based on an example pyramid and a facial recognition apparatus.

2. Description of the Related Art

Recently, an importance of security has been increasing in various fields including, for example, banking, security, or technical information protection. Accordingly, an increasing number of security cameras have been installed, and a type and amount of images stored in a security image archive are also increasing. By conducting a search of the security image archive, an incident may be prevented or a type of crime and a criminal may be detected in an event of the incident. However, rapidly completing such a search of the security image archive in which images acquired from numerous cameras are stored is difficult.

SUMMARY

Accordingly, there is a desire for a search method of recognizing a feature of an image to acquire a desired image of a situation from among images stored in a high capacity archive. In general, in a stored image, facial recognition performance may be degraded in response to changes in a posture, lighting, or an expression and thus, product application may not be commonly available.

At least one example embodiment relates to a method of extracting a feature of an input image.

According to an example embodiment, a method of extracting a feature of an input image includes constructing a example pyramid including at least one hierarchical level based on stored example images, generating a codebook included in each of the at least one hierarchical level, calculating a similarity between the codebook and the input image, and extracting a feature of the input image based on the similarity.

At least some example embodiments provide the constructing may include generating example image groups for each of the at least one hierarchical level by clustering the example images based on a reference, and constructing the example pyramid based on the example image groups.

At least some example embodiments provide that the generating the example image groups may include projecting a feature vector of the example images to a feature space, and generating the example image groups for each of the at least one hierarchical level by clustering the feature vector based on a distance in the feature space.

At least some example embodiments provide that the generating the codebook may include generating a plurality of visual words based on example image groups included in each of the at least one hierarchical level, and generating the codebook based on the visual words.

At least some example embodiments provide that the generating the visual words may include performing vector quantization on the example image groups included in each of the at least one hierarchical level, and generating the visual words based on the vector quantization.

At least some example embodiments provide that the generating the visual words may include performing sparse coding on the example image groups included in each of the at least one hierarchical level, and generating the visual words based on the sparse coding.

At least some example embodiments provide that the calculating may include measuring distances between the input image and a plurality of groups associated with visual words included in the codebook in a feature space, and calculating the similarity based on the measured distances.

At least some example embodiments provide that the method may further include concatenating the measured distances.

At least some example embodiments provide that the extracting may include extracting the feature of the input image based on a distribution of a probability value with respect to the similarity.

At least some example embodiments provide that the extracting may include assigning a weight to the distribution of the probability value, and extracting the feature of the input image based on the weight.

At least one example embodiment relates to a facial recognition apparatus.

According to an example embodiment, a facial recognition apparatus includes a face extractor configured to extract a facial area from an input image, a normalizer configured to perform normalization on the facial area, a feature extractor configured to extract a feature of the input image based on the normalized facial area and a stored codebook, and a recognizer configured to recognize a face based on the extracted feature, wherein the codebook is based on example image groups included in each level of a example pyramid using stored example images.

At least some example embodiments provide that the feature extractor may be configured to calculate a similarity between the normalized facial area and the codebook, and extract the feature of the input image based on the similarity.

At least some example embodiments provide that the feature extractor may be configured to measure distances between the normalized facial area and a plurality of groups associated with visual words included in the codebook in a feature space, and calculate the similarity based on the measured distances.

At least some example embodiments provide that the feature extractor may be configured to assign a weight to a distribution of a probability value with respect to the similarity, and extract the feature of the input image based on the weight.

At least some example embodiments provide that the recognizer may be configured to recognize a face using a classifier based on the extracted feature.

At least some example embodiments provide that the apparatus may further include a codebook generator configured to construct the example pyramid including at least one hierarchical level based on the stored example images, and generate the codebook for an example image groups included in each of the at least one hierarchical level.

At least some example embodiments provide that the codebook generator may be configured to project a feature vector of the stored example images onto a feature space, generate the example image groups for each of the at least one hierarchical level by clustering the feature vector based on a distance in the feature space, and construct the example pyramid based on the example image groups.

At least some example embodiments provide that the codebook generator may be configured to generate a plurality of visual words based on the example image groups included and generate the codebook based on the visual words.

At least some example embodiments provide that the codebook generator may be configured to perform vector quantization on the example image groups included and generate the visual words based on the vector quantization.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIG. 3 illustrates an example of constructing an example pyramid in a method of extracting a feature of an input image according to at least one example embodiment;

DETAILED DESCRIPTION

Figure 1:
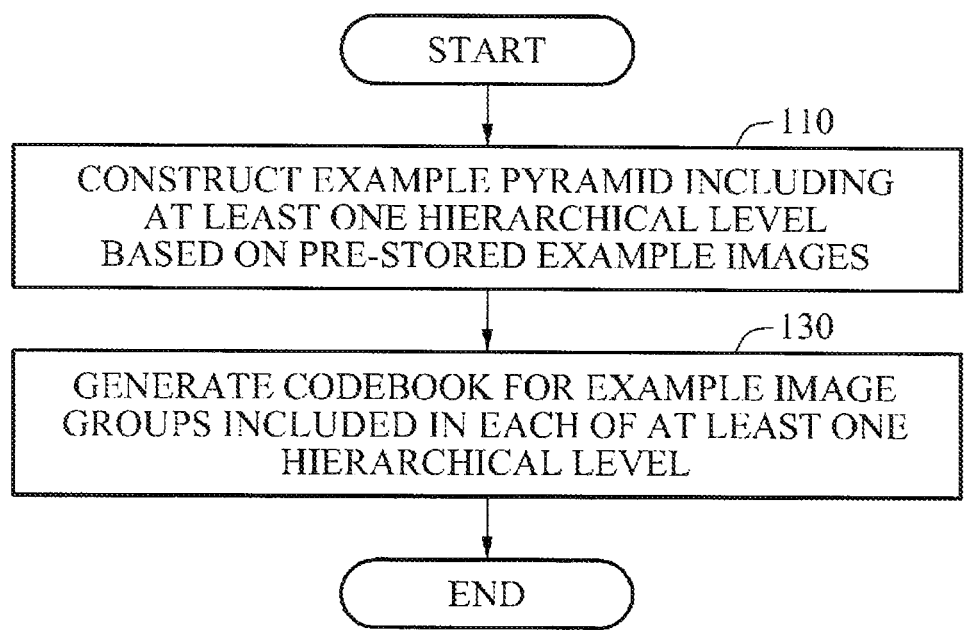
FIG. 1 illustrates an example of a codebook generation method according to at least one example embodiment.

A computer system may be used as a reference to explain example embodiments described below. It will be sufficiently understood by those skilled in the art that systems and methods described below may be applicable to a display system including a user interface. In particular, a user authentication method and apparatus based on a facial recognition provided in the present disclosure may be implemented by a computer system including at least one processor, a memory, and a display device. As known by those skilled in the art, the computer system may be, for example, a portable device such as a cellular phone and the like.

As used herein, the terms "embodiment," "example," "aspect," and "instance" should not be interpreted to mean that a certain aspect or design is superior to or advantageous compared to another aspect of design.

As used in this application, the terms "component", "module", "system" and "interface" are intended to refer to a computer-related entity, for example, either hardware, a combination of hardware and software, software, or software in execution.

As used herein, the term "or" is intended to mean an inclusive "or" rather than an exclusive "or." That is, unless specified otherwise, or clear from context, "X uses A or B" is intended to mean any of the natural inclusive permutations.

Moreover, articles "a" and "an" as used in the subject specification and annexed drawings should generally be construed to mean "at least one" unless specified otherwise or clear from context to be directed to a singular form.

It will be understood that, as used herein, the term "and/or," includes any and all combinations of one or more of the associated listed items.

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Hereinafter, example embodiments will be described in detail with reference to the accompanying drawings. However, it should be understood that example embodiments are not construed as limited thereto. Like reference numerals in the drawings denote like elements.

In the following description, an input image may be explained based on a face image as an example. However, an image of a body part unique for each user may also be used as the input image.

FIG. 1 illustrates an example of a codebook generation method according to at least one example embodiment.

Referring to FIG. 1, in operation 110, an apparatus for extracting a feature of an input image according to at least one example embodiment constructs an example pyramid (example pyramid) including at least one hierarchical level based on pre-stored example images. Hereinafter, the apparatus for extracting a feature of an input image may also be referred to as an extracting apparatus.

In operation 110, the extracting apparatus may generate example image groups for each of the at least one hierarchical level by clustering the example images based on a predetermined and/or selected reference.

The extracting apparatus may project a feature vector of the example images to a feature space, and generate the example image groups by clustering the feature vector based on a distance in the feature space. The example image groups may be generated for each of the at least one hierarchical level. The extracting apparatus may generate a single example image group as well as a plurality of example image groups.

Figure 2:
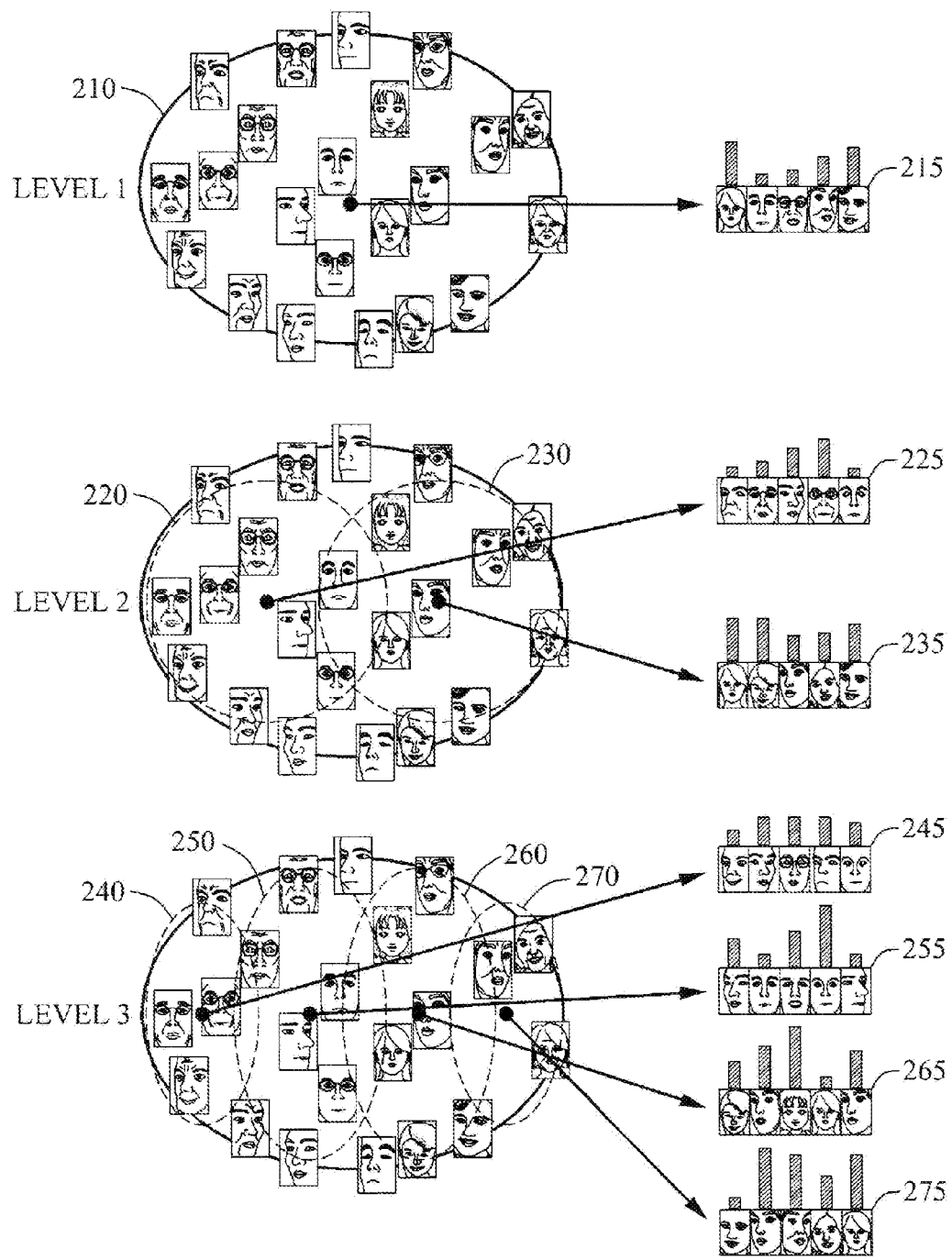
FIG. 2 illustrates an example of an example pyramid constructed based on a method of extracting a feature of an input image according to at least one example embodiment.

The extracting apparatus may construct the example pyramid using example image groups. An example of the example pyramid constructed according to at least one example embodiment is illustrated in FIG. 2.

In operation 130, the extracting apparatus generates a codebook for the example image groups included in each of the at least one hierarchical level. In operation 130, the extracting apparatus may form a plurality of sets having similar features based on the example image groups included in each of the at least one hierarchical level, generate a plurality of visual words for each of the sets and then, generate the codebook based on the visual words.

In this example, the visual words may be small patches of an image or a pixel array transferring information of interest, for example, a color change and a texture change, in a predetermined and/or selected feature space.

The extracting apparatus may perform vector quantization on the example image groups included in each of the at least one hierarchical level, and generate the visual words based on a result of the vector quantization.

In an example, the extracting apparatus may perform sparse coding on the example image groups included in each of the at least one hierarchical level, and generate the visual words based on a result of the sparse coding.

The codebook generated in operations 110 and 130 may be stored in a database or a memory. A process of generating the codebook based on operations 110 and 130 may be performed through learning in advance. Thus, the process of generating the codebook may also be referred to as a learning procedure. Hereinafter, descriptions about the process of generating the codebook will be provided with reference to FIGS. 2 through 5.

FIG. 2 illustrates an example of an example pyramid constructed based on a method of extracting a feature of an input image according to at least one example embodiment.

FIG. 2 illustrates an example pyramid including a hierarchical level.

In an example, the example pyramid may be constructed by classifying pre-stored example images based on a distance in a feature space. In this example, the example images may include face images of users corresponding to race, age, and gender.

The extracting apparatus may project a feature vector to the feature space, and generate example image groups by clustering the feature vector based on a distance in the feature space. By adjusting a level of the example pyramid, the extracting apparatus may extend or optimize the feature vector such that an input image is adjusted based on a situation.

In the example pyramid of FIG. 2, one example image group 210 may be generated in a first level, two example image groups 220 and 230 may be generated in a second level, and four example image groups 240, 250, 260, and 270 may be generated in a third level.

In this example, the example image groups 240, 250, 260, and 270 of the third level may correspond to groups obtained by classifying the example image groups 220 and 230 of the second level for each feature based on a predetermined and/or selected reference.

An extracting apparatus may generate a codebook 215 for the example image group 210 in the first level, and may generate codebooks 225 and 235 for the example image groups 220 and 230, respectively. The extracting apparatus may generate codebooks 245, 255, 265, and 275 for the example image groups 240, 250, 260, and 270 in the third level, respectively.

In an example, an individual codebook may be generated for each clustered example image group. Each of the codebooks 215, 225, 235, 245, 255, 265, and 275 may include a plurality of visual words.

In an example, information on a distance between an input image and each of example images may be used as a feature, and a codebook may be generated by classifying the example images for each feature. Through this, detailed features may be extracted from the input image.

FIG. 3 illustrates an example of constructing an example pyramid in a method of extracting a feature of an input image according to at least one example embodiment.

Referring to FIG. 3, example image groups 310 and 330 include a plurality of example images. Also, the example image groups 310 and 330 include anchor images 315 and 335, respectively. In this example, each of the anchor images 315 and 335 may be an average image of elements configuring a corresponding group, and technically indicate an average of a plurality of clusters.

Due to intra and extra facial variations, example images may be clustered into the example image groups 310 and 330 in a feature space.

An individual face image may have a different distance measured from the example images. In an example, the distance may be used as a feature of the face image.

In the feature space, for example, a distance between female face images may be less than a distance between a female face image and a male face image, and a distance between male face images may be less than the distance between the female face image and the male face image. Thus, the female face images and the male face images may be clustered into corresponding clusters, respectively. In each cluster, distances between the anchor images 315 and 335 and other images may be used as features of faces images included in the corresponding cluster.

Figure 4:
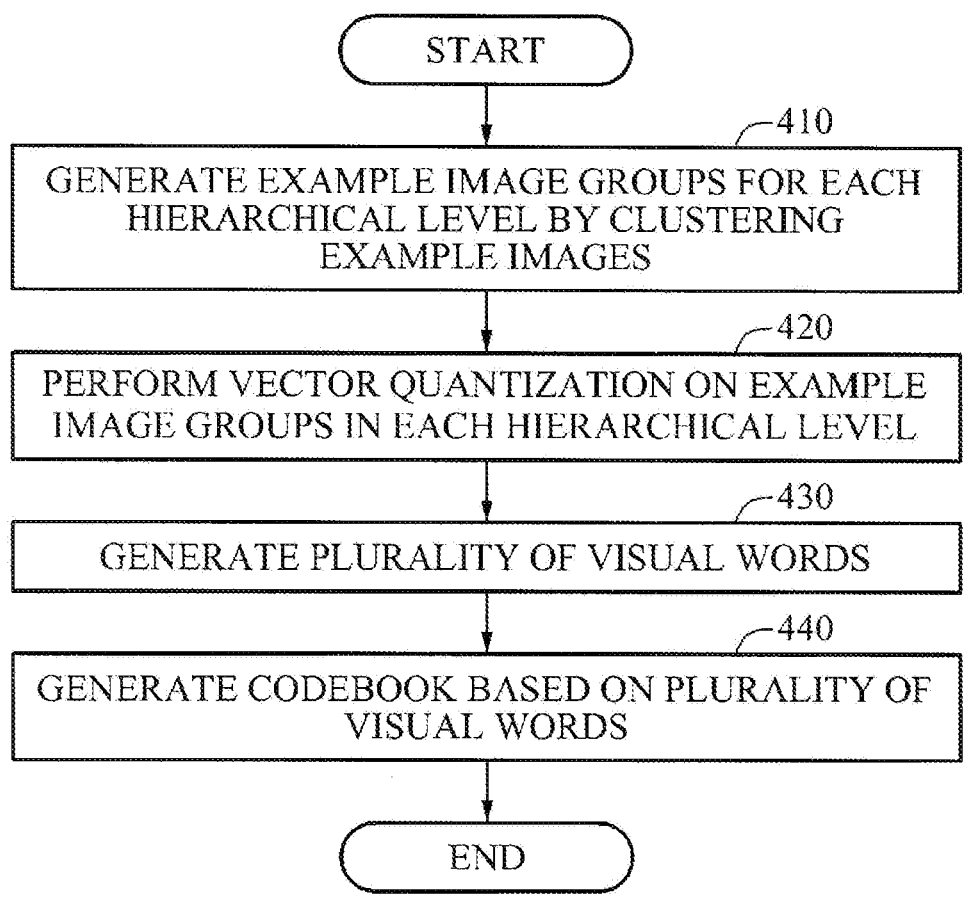
FIG. 4 illustrates an example of a codebook generation method in a method of extracting a feature of an input image according to at least one example embodiment.

FIG. 4 illustrates a learning procedure for generating a codebook in a method of extracting a feature of an input image according to at least one example embodiment.

Referring to FIG. 4, in operation 410, an extracting apparatus generates example image groups for each hierarchical level by clustering example images based on a predetermined and/or selected reference.

In operation 420, the extracting apparatus performs vector quantization on the example image groups in each hierarchical level.

In operation 430, the extracting apparatus generates a plurality of visual words based on a result of the vector quantization performed in operation 420. Depending on an example, the extracting apparatus may perform sparse coding on the example image groups in each hierarchical level, and generate a plurality of visual words based on a result of the sparse coding.

Figure 5:
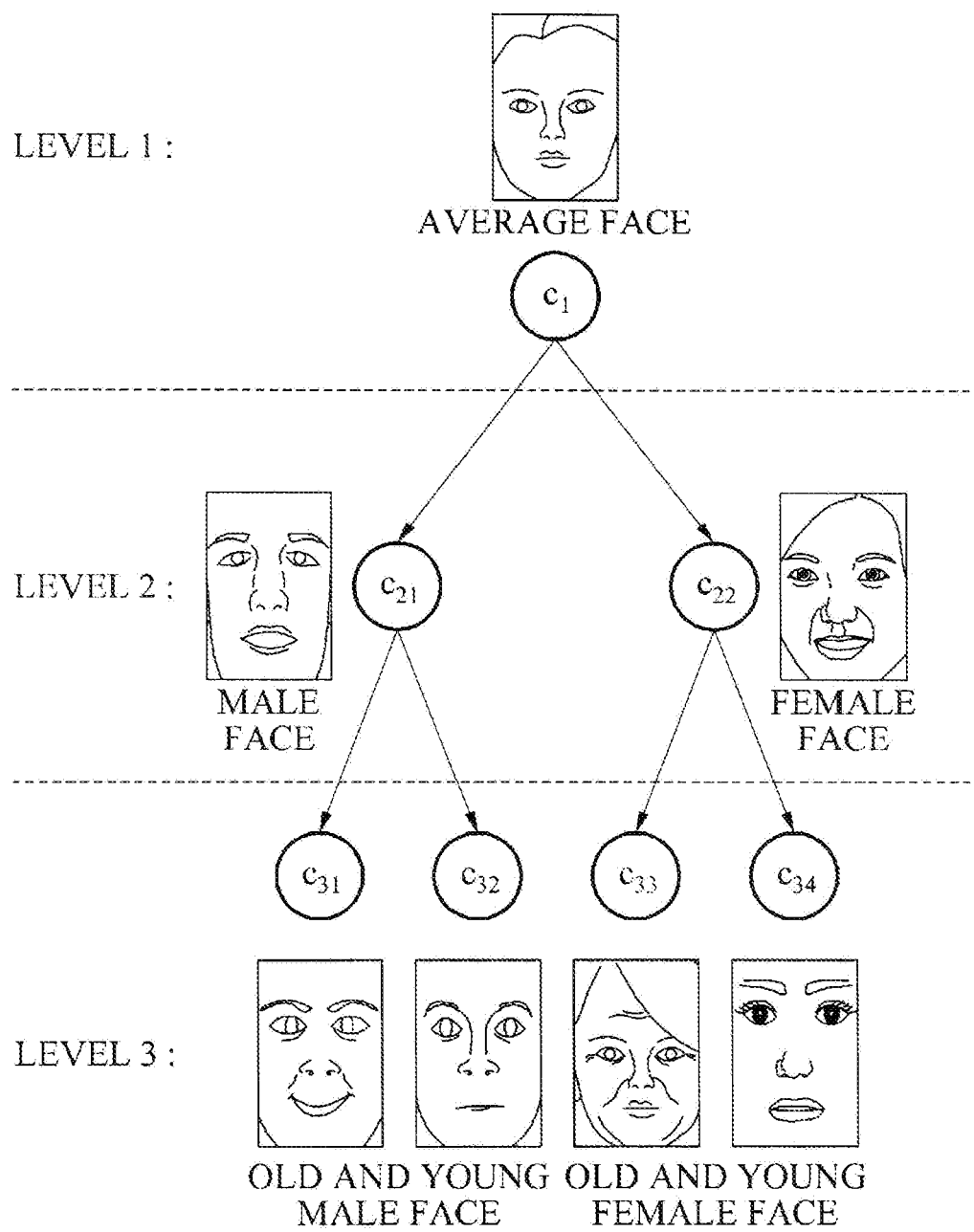
FIG. 5 illustrates an example of an example pyramid constructed based on a method of extracting a feature of an input image and an example of example image groups included in each level of the example pyramid according to at least one example embodiment.

In operation 440, the extracting apparatus generates a codebook based on the plurality of visual words generated in operation 430. As illustrated in FIG. 5, the codebook may be generated for each level of an example pyramid, and for each example image group included in the each level.

FIG. 5 illustrates an example pyramid constructed based on a method of extracting a feature of an input image and example image groups included in each level of the example pyramid according to at least one example embodiment.

Referring to FIG. 5, the example pyramid may have three levels.

A codebook $C_1$ generated at a level 1 of the example pyramid may correspond to, for example, an average face image obtained by averaging distances among all example images in a feature space.

At a level 2, the extracting apparatus may generate two example image groups by segmenting the distances averaged at the level 1. In this example, one example image group may be an example image group clustered based on a male face, and another example image group may be an example image group clustered based on a female face.

The extracting apparatus may generate a codebook $C_{21}$ using a plurality of visual words corresponding to a common feature of the example image group clustered based on the male face. Also, the extracting apparatus may generate a codebook $C_{22}$ using a plurality of visual words corresponding to a common feature of the example image group clustered based on the female face.

At a level 3, the extracting apparatus may generate four new example image groups by segmenting the example image groups clustered at the level 2.

In this example, two of the new example image groups may be obtained by segmenting the example image group clustered based on the male face, and two of the other new example image groups may be obtained by segmenting the example image group clustered based on the female face.

The extracting apparatus may segment distances among example images in the example image group clustered based on the male face, thereby generating example image groups clustered based on a young male face and an old male face, respectively.

The extracting apparatus may generate a codebook $C_{31}$ for the example image group clustered based on the old male face, and generate a codebook $C_{32}$ for the example image group clustered based on the young male face.

The extracting apparatus may segment distances among example images in the example image group clustered based on the female face, thereby generating example image groups clustered based on a young female face and an old female face, respectively.

The extracting apparatus may generate a codebook $C_{33}$ for the example image group clustered based on the old female face, and generate a codebook $C_{34}$ for the example image group clustered based on the young female face.

In an example, as a level of an example pyramid increases, example image groups generated for each level may represent more detailed features, for example, a male and a female, a light complexion and a dark complexion, and an old man and a young man. Since the example image groups represent more detailed features according to an increase in the hierarchical level of the example pyramid or descending to a lower level of the example pyramid, a desired feature may be extracted through an extension or an optimization by adjusting the hierarchical level of the example pyramid.

Figure 6:
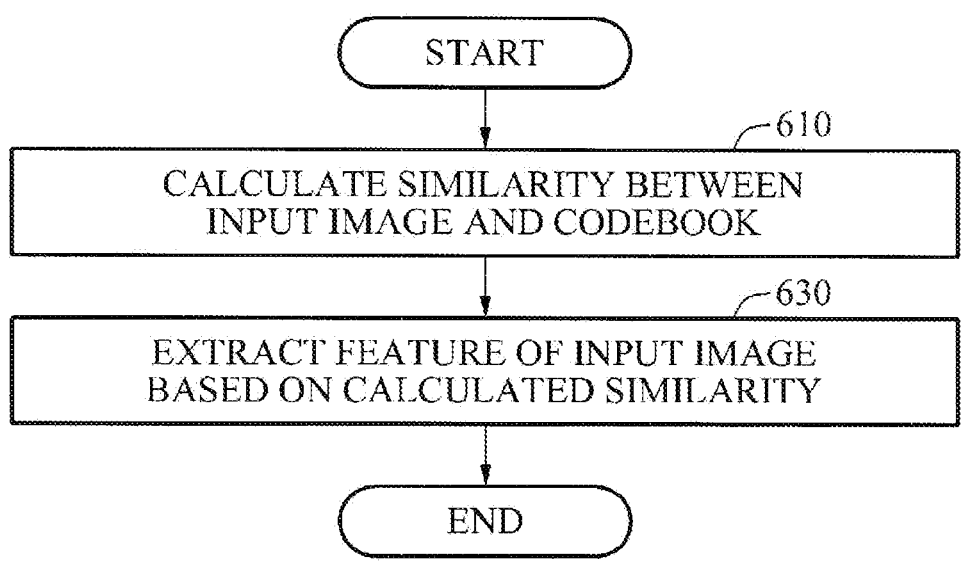
FIG. 6 illustrates a method of extracting a feature of an input image according to at least one example embodiment.

FIG. 6 illustrates a method of extracting a feature of an input image according to at least one example embodiment.

Referring to FIG. 6, in operation 610, an extracting apparatus calculates a similarity between an input image and a codebook.

The extracting apparatus may measure a distance between the input image and each of a plurality of visual words included in the codebook in a feature space, and calculate the similarity based on the measured distance. The extracting apparatus may measure the distance between the input image and each of the visual words included in the codebook in the feature space using, for example, an L2 distance, which is a Euclidean distance formula.

The extracting apparatus may measure the distance between the input image and each of the visual words projected onto the feature space based on a feature extracted from the input image.

In operation 630, the extracting apparatus extracts the feature of the input image based on the similarity calculate in operation 610. The extracting apparatus may extract the feature of the input image based on a distribution of a probability value with respect to the calculated similarity, or extract the feature of the input image based on a result of assigning a weight to the distribution of the probability value. Operations 610 and 630 may also be referred to as a feature extraction procedure.

Figure 7:
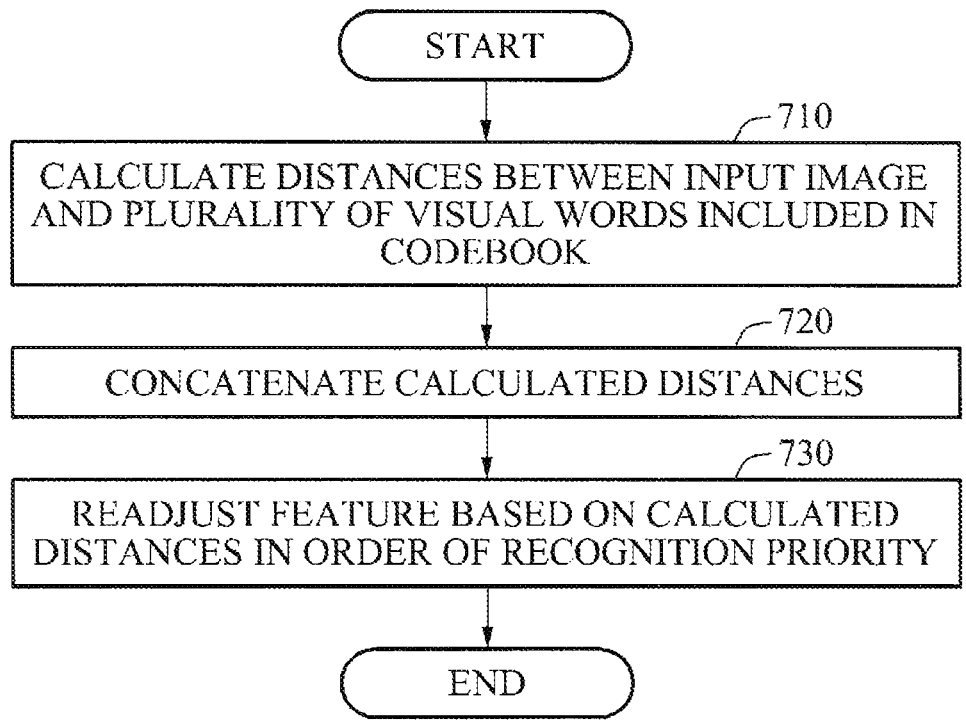
FIG. 7 illustrates an example of extracting a feature of an input image based on a method of extracting a feature of an input image according to at least one example embodiment.

FIG. 7 illustrates a feature extraction procedure for extracting a feature of an input image in a method of extracting a feature of an input image according to at least one example embodiment.

Referring to FIG. 7, in operation 710, an extracting apparatus calculates distances between an input image and a plurality of visual words included in a codebook in a feature space. The codebook may relate to example image groups included in each level, and may be provided in single and plural forms. The extracting apparatus may calculate a similarity between the input image and the codebook based on the calculated distances. In this example the extracting apparatus may extract a feature of the input image based on a distribution of a probability value with respect to the similarity calculated in operation 710.

The distribution, for example, $u_{ij}$, of the probability value with respect to the similarity may be expressed by Equation 1.

$$u_{ij} = \frac{\exp(-\beta\|x_i - b_j\|_2^2)}{\sum_{k=1}^{n} \exp(-\beta\|x_i - b_k\|_2^2)} \quad \text{[Equation 1]}$$

In Equation 1, $\beta$ denotes a weight, $X_i$ denotes the input image, $b_j$ denotes an example image, and $b_k$ denotes a total sum of example images.

In operation 720, the extracting apparatus concatenates the distances between the visual words and the input image calculated in operation 710 after normalization of the input image.

In operation 730, for a local smooth sparsity, the extracting apparatus readjusts a feature or a feature value based on the calculated distances by analyzing an influence of single-feature elements on a recognition result, for example, the distances between the input image and the visual words concatenated in operation 720, in order of a recognition priority.

Figure 8:
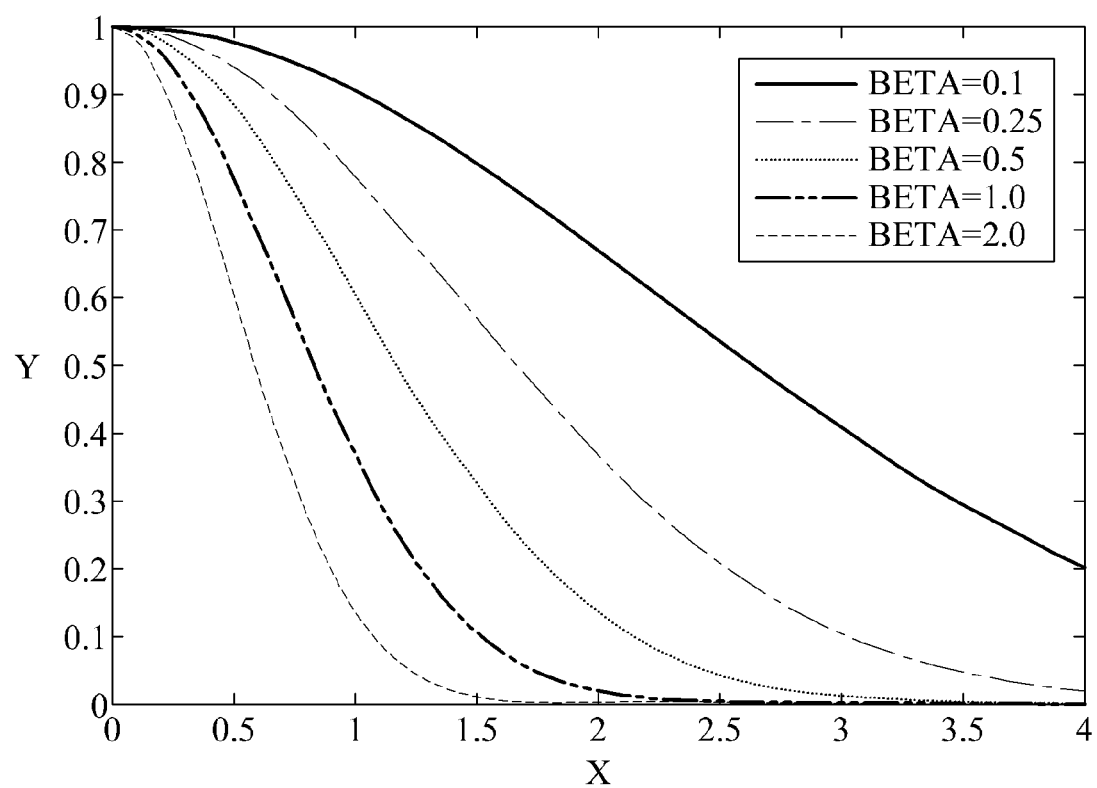
FIG. 8 illustrates an example of a result obtained by readjusting a distance-based feature based on a recognition priority by using a method of extracting a feature of an input image according to at least one example embodiment.

Descriptions with respect to a result of readjusting the distance-based feature based on the recognition priority using the extracting apparatus will be provided with reference to a graph of FIG. 8.

Depending on an example, the extracting apparatus may cut-off a dissimilar codebook response such as a locality-constrained linear coding (LLC), based on the distribution of the probability value with respect to the similarity calculated in operation 710, thereby extracting the feature of the input image.

Also, for a local smoothness, the extracting apparatus may assign the weight to the distribution of the probability value, thereby extracting the feature of the input image. Subsequently, the extracting apparatus may perform facial recognition using a recognizer such as a support vector machine (SVM).

FIG. 8 is a graph illustrating a result obtained by readjusting a distance-based feature based on a recognition priority by using a method of extracting a feature of an input image according to at least one example embodiment.

A result of readjusting a feature element value based on a beta value may be indicated with reference to FIG. 8. In the graph of FIG. 8, an x-axis represents the beta value, and a y-axis represents a function(x). In this example, the function (x) may be exp(-beta*x.^2). Also, the corresponding function may be used to correct a distance value based on a probability value and correct a variation and a range of the corrected distance value. The beta value may be a parameter for correcting a change in a value.

Also, an x-input may be a distance value between an example image and an input image, and a y-output may be a value resulting from a correction of a change in the distance value based on the beta value.

When the beta value is relatively large, the extracting apparatus may amplify a feature element disposed in a short distance while a feature element disposed in a long distance is close to "0". However, an inverse result may be obtained when the beta value is relatively small.

In FIG. 8, when an x-value is relatively small, a feature element may be disposed at a short distance. Conversely, when the x-value is relatively large, the feature element may be disposed at a long distance.

Figure 9:
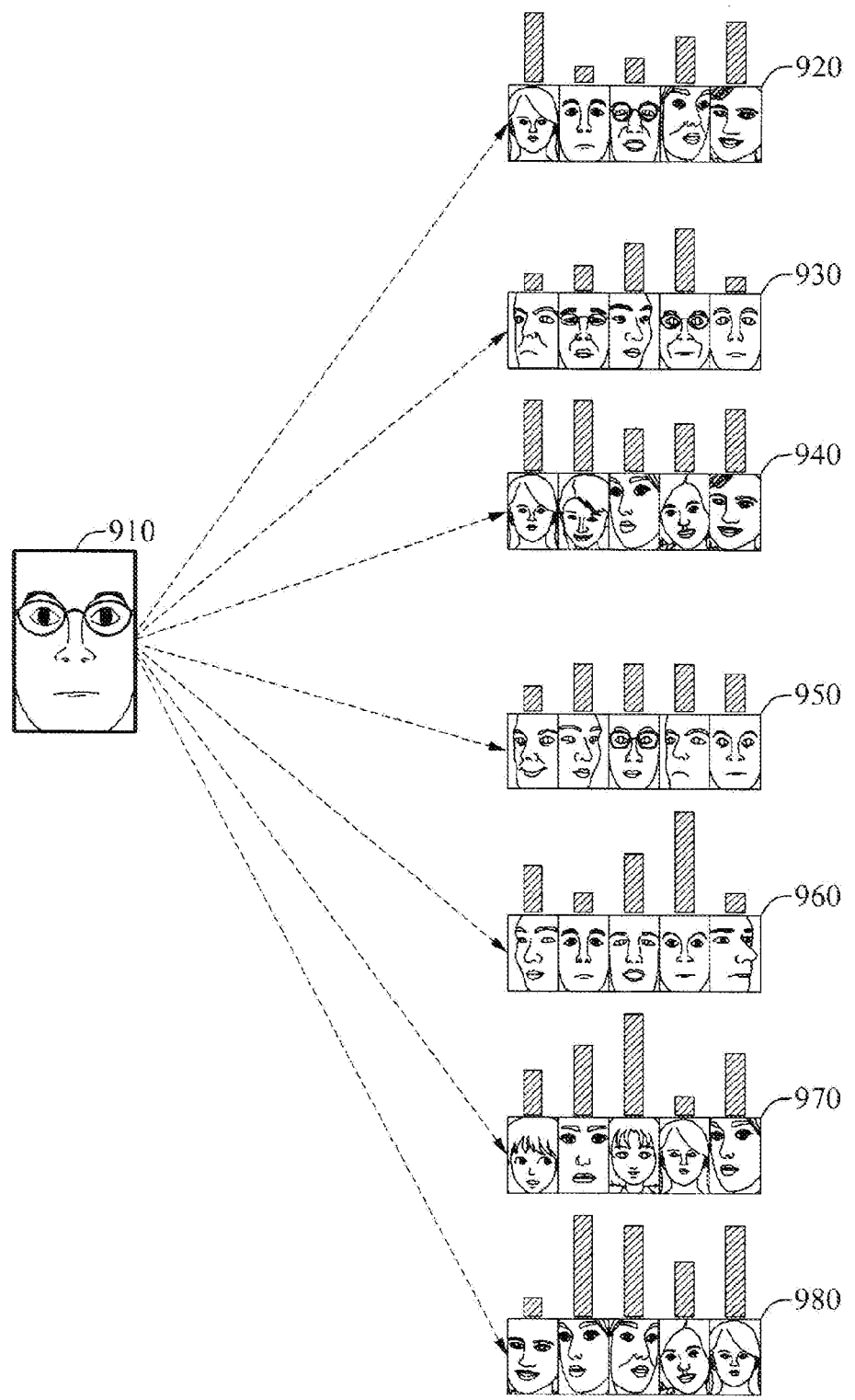
FIG. 9 illustrates an example of a method of calculating a similarity between an input image and a codebook based on a method of extracting a feature of an input image according to at least one example embodiment.

FIG. 9 illustrates an example of a method of calculating a similarity between an input image and a codebook based on a method of extracting a feature of an input image according to example embodiments.

An input image 910 and seven codebooks 920, 930, 940, 950, 960, 970, and 980 for example image groups included in each level may be indicated with reference to FIG. 9.

Each of the seven codebooks 920, 930, 940, 950, 960, 970, and 980 may include five different visual words, and an extracting apparatus may calculate distances between the input image 910 and the visual words included in each of the seven codebooks 920, 930, 940, 950, 960, 970, and 980.

The extracting apparatus may concatenate the distances between the input image 910 and the visual words included in each of the seven codebooks 920, 930, 940, 950, 960, 970, and 980 into a single feature after normalization of the input image 910.

Figure 10:
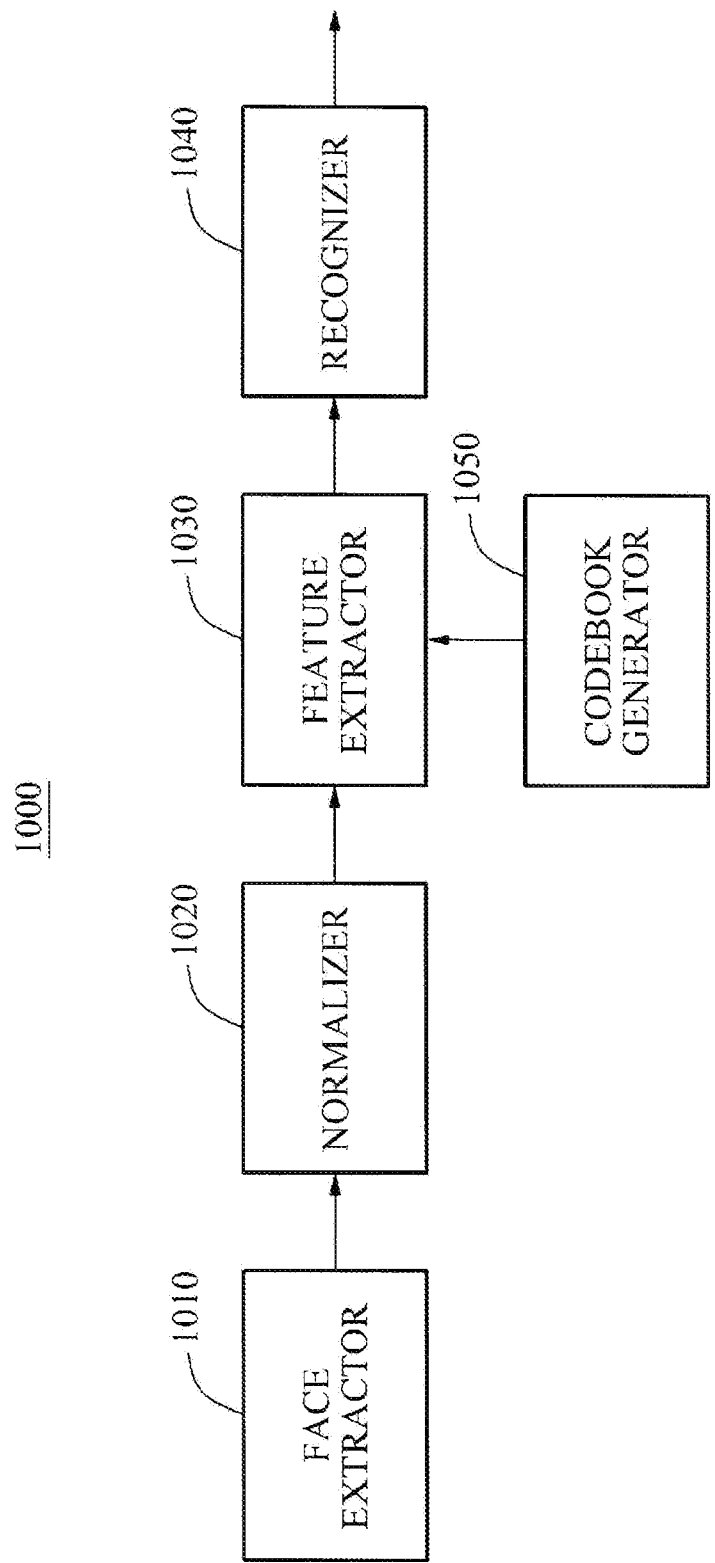
FIG. 10 illustrates an example of a facial recognition apparatus according to at least one example embodiment.

FIG. 10 illustrates an example of a facial recognition apparatus according to at least one example embodiment.

Referring to FIG. 10, an extracting apparatus 1000 includes a face extractor 1010, a normalizer 1020, a feature extractor 1030, and a recognizer 1040. Also, the extracting apparatus 1000 may further include a codebook generator 1050.

The extracting apparatus 1000 may be the extracting apparatus described in any of the previous embodiments.

The extracting apparatus 1000 may be hardware, firmware, hardware executing software or any combination thereof. When the extracting apparatus 1000 is hardware, such existing hardware may include one or more Central Processing Units (CPUs), digital signal processors (DSPs), application-specific-integrated-circuits (ASICs), field programmable gate arrays (FPGAs) or the like configured as special purpose machines to perform the functions of the face extractor 1010, the normalizer 1020, the feature extractor 1030, the recognizer 1040 and the codebook generator 1050. CPUs, DSPs, ASICs and FPGAs may generally be referred to as processing devices.

In the event where the extracting apparatus 1000 is a processor executing software, the processor is configured as a special purpose machine to execute the software, stored in a storage medium, to perform the functions of the face extractor 1010, the normalizer 1020, the feature extractor 1030, the recognizer 1040 and the codebook generator 1050. In such an embodiment, the processor may include one or more Central Processing Units (CPUs), digital signal processors (DSPs), application-specific-integrated-circuits (ASICs), field programmable gate arrays (FPGAs).

The face extractor 1010 may extract a facial area from an input image.

The normalizer 1020 may perform normalization on the facial area extracted by the face extractor 1010.

The feature extractor 1030 may extract a feature of the input image based on a pre-stored codebook and the facial area normalized by the normalizer 1020. In this example, the codebook may be obtained based on example image groups included in each level of an example pyramid constructed based on pre-stored example images.

The codebook may be stored in, for example, the codebook generator 1050, in advance.

The feature extractor 1030 may calculate a similarity between the normalized facial area and the codebook, and extract the feature of the input image based on the calculated similarity.

The feature extractor 1030 may measure distances between the normalized facial area and a plurality of visual words included in the codebook, and calculated the similarity based on the measured distances.

The feature extractor 1030 may assign a weight to a distribution of a probability value with respect to the calculated similarity, and extract the feature of the input image based on the weight.

The recognizer 1040 may recognize a face based on the feature extracted by the feature extractor 1030.

The recognizer 1040 may recognize the face using a classifier based on the feature extracted by the feature extractor 1030.

The codebook generator 1050 may construct an example pyramid including at least one hierarchical level based on the pre-stored example images. The codebook generator 1050 may generate a codebook for example image groups included in each of the at least one hierarchical level.

The codebook generator 1050 may project a feature vector of the example images onto a feature space, and generate the example image groups for each of the at least one hierarchical level by clustering the feature vector of the example images based on a distance in the feature space. The codebook generator 1050 may construct the example pyramid using the example image groups.

The codebook generator 1050 may generate a plurality of visual words based on the example image groups included in each of the at least one hierarchical level, and generate the codebook based on the visual words.

The codebook generator 1050 may perform vector quantization on the example image groups included in each of the at least one hierarchical level, and generate the visual words based on a result of the vector quantization.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of extracting a feature of an input image, the method comprising:
constructing an example pyramid including at least two hierarchical levels based on stored example images which include face images of different users;
generating a codebook in each of the at least two hierarchical levels;
calculating a similarity between each codebook and the input image; and
extracting a feature of the input image based on the similarity,
wherein the example pyramid is constructed using example image groups generated for each of the at least two hierarchical levels by clustering a feature vector of the stored example images based on a distance in a feature space.

2. The method of claim 1, wherein the constructing comprises:
generating the example image groups for each of the at least two hierarchical levels by clustering the stored example images based on a reference; and
constructing the example pyramid based on the example image groups.

3. The method of claim 2, wherein the generating the example image groups comprises:
projecting the feature vector of the stored example images to the feature space.

4. The method of claim 1, wherein the generating each codebook comprises:
generating a plurality of visual words based on the example image groups in each of the at least two hierarchical levels; and
generating each codebook based on the visual words.

5. The method of claim 4, wherein the generating the visual words comprises:
performing vector quantization on the example image groups in each of the at least two hierarchical levels; and
generating the visual words based on the vector quantization.

6. The method of claim 4, wherein the generating the visual words comprises:
performing sparse coding on the example image groups in each of the at least two hierarchical levels; and
generating the visual words based on the sparse coding.

7. The method of claim 1, wherein the calculating comprises:
measuring a plurality of distances between the input image and a plurality of groups associated with visual words in each codebook in the feature space; and
calculating the similarity based on the measured distances.

8. The method of claim 7, further comprising:
concatenating the measured distances, wherein the similarity is based on the concatenated measured distances.

9. The method of claim 1, wherein the extracting comprises:
extracting the feature of the input image based on a distribution of a probability value with respect to the similarity.

10. The method of claim 9, wherein the extracting comprises:
assigning a weight to the distribution of the probability value; and
extracting the feature of the input image based on the weight.

11. A non-transitory computer-readable medium comprising program code that, when executed by a processor, causes the processor to perform the method of claim 1.

12. A facial recognition apparatus comprising:
at least one processor configured to execute computer readable instructions to,
extract a facial area from an input image;
perform normalization on the facial area;
extract a feature of the input image based on the normalized facial area and a stored codebook;
recognize a face based on the extracted feature, the stored codebook is based on example image groups, the example image groups are in each level of an example pyramid using stored example images which include face images of different users; and
construct the example pyramid using the example image groups by clustering a feature vector of the stored example images based on a distance in a feature space; and
generate the stored codebook for the example image groups in each of at least two hierarchical levels of the example pyramid.

13. The apparatus of claim 12, wherein the at least one processor is configured to execute the computer readable instructions to calculate a similarity between the normalized facial area and the stored codebook, and extract the feature of the input image based on the similarity.

14. The apparatus of claim 13, wherein the at least one processor is configured to execute the computer readable instructions to measure a plurality of distances between the normalized facial area and a plurality of groups associated with visual words in the codebook in the feature space, and calculate the similarity based on the measured distances.

15. The apparatus of claim 14, wherein the at least one processor is configured to execute the computer readable instructions to assign a weight to a distribution of a probability value with respect to the similarity, and extract the feature of the input image based on the weight.

16. The apparatus of claim 12, wherein the at least one processor is configured to execute the computer readable instructions to recognize a face using a classifier based on the extracted feature.

17. The apparatus of claim 12, wherein the at least one processor is configured to execute the computer readable instructions to project the feature vector of the stored example images onto the feature space.

18. The apparatus of claim 12, wherein the at least one processor is configured to execute the computer readable instructions to generate a plurality of visual words based on the example image groups and generate the stored codebook based on the visual words.

19. The apparatus of claim 18, wherein at least one processor is configured to execute the computer readable instructions to perform vector quantization on the example image groups and generate the visual words based on the vector quantization.

20. The method of claim 8, further comprising:
adjusting a weight based on the concatenated measured distances; and
applying the adjusted weight to the measured distances, wherein the calculating the similarity calculates the similarity based on the applying.

21. The method of claim 20, further comprising:
determining a distribution of a probability value with respect to the similarity using the weight, wherein the extracting extracts the feature of the input image based on the distribution of the probability value with respect to the similarity.

22. The apparatus of claim 13, wherein the at least one processor is configured to execute the computer readable instructions to,
concatenate measured distances between the input image and visual words of the stored codebook,
adjust a weight based on the concatenated measured distances, and
apply the adjusted weight to the measured distances, wherein the processor is configured to calculate the similarity based on the applied adjusted weight.

23. The apparatus of claim 22, wherein the at least one processor is configured to execute the computer readable instructions to,
determine a distribution of a probability value with respect to the similarity using the weight, wherein the processor is configured to extract the feature of the input image based on the distribution of the probability value with respect to the similarity.

* * * * *